United States Patent
Smith et al.

(10) Patent No.: US 9,900,344 B2
(45) Date of Patent: Feb. 20, 2018

(54) IDENTIFYING A POTENTIAL DDOS ATTACK USING STATISTICAL ANALYSIS

(71) Applicant: LEVEL 3 COMMUNICATIONS, LLC, Broomfield, CO (US)

(72) Inventors: Robert Smith, Irvine, CA (US); Shawn Marck, San Francisco, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/931,138

(22) Filed: Nov. 3, 2015

(65) Prior Publication Data
US 2016/0127406 A1 May 5, 2016

Related U.S. Application Data

(60) Provisional application No. 62/074,407, filed on Nov. 3, 2014.

(51) Int. Cl.
*H04L 29/06* (2006.01)

(52) U.S. Cl.
CPC .................. *H04L 63/1458* (2013.01)

(58) Field of Classification Search
CPC . H04L 63/20; H04L 63/1458; H04L 63/1416; H04L 63/1425; H04L 63/1433; H04L 63/1441; H04L 63/145
USPC ..................................................... 726/22–26
See application file for complete search history.

(56) References Cited

U.S. PATENT DOCUMENTS

| | | | | |
|---|---|---|---|---|
| 7,478,429 | B2 * | 1/2009 | Lyon | H04L 29/06027 726/2 |
| 8,001,583 | B2 * | 8/2011 | Waizumi | H04L 63/1458 726/3 |
| 8,010,469 | B2 * | 8/2011 | Kapoor | G06F 9/505 706/20 |
| 8,239,687 | B2 * | 8/2012 | Stolfo | G06F 21/552 713/188 |
| 8,621,065 | B1 | 12/2013 | Saurel | |
| 8,635,703 | B1 * | 1/2014 | Belani | H04L 63/1433 726/22 |
| 2003/0145232 | A1 | 7/2003 | Poletto et al. | |
| 2005/0060412 | A1 | 3/2005 | Chebolu et al. | |
| 2006/0212572 | A1 | 9/2006 | Afek | |

(Continued)

OTHER PUBLICATIONS

International Search Report dated Dec. 10, 2015, Int'l Appl. No. PCT/US15/049960; Int'l Filing Date Sep. 14, 2015; 3 pgs.

(Continued)

*Primary Examiner* — Hosuk Song

(57) ABSTRACT

Embodiments can identify requests that may be tied to a DDOS attack. For example, the primary identifiers (e.g., a source address) of requests for a network resource (e.g., an entire website or a particular element of the website) can be tracked. In one embodiment, a statistical analysis of how often a particular source address (or other primary identifier) normally makes a request can be used to identify source addresses that make substantially more requests. A normal amount can correspond to an average number of request that a source address makes. According to some embodiments, a system can use statistical analysis methods on various request data in web server logs to identify potential attacks and send data concerned potential attacks to an HBA system for further analysis.

19 Claims, 4 Drawing Sheets

(56) References Cited

U.S. PATENT DOCUMENTS

| | | | |
|---|---|---|---|
| 2011/0138463 | A1 | 6/2011 | Kim et al. |
| 2012/0124666 | A1 | 5/2012 | Kim et al. |
| 2013/0152153 | A1 | 6/2013 | Weiser et al. |
| 2013/0219502 | A1 | 8/2013 | Danford et al. |
| 2013/0291107 | A1 | 10/2013 | Marck et al. |
| 2014/0150095 | A1 | 5/2014 | Zhao et al. |

OTHER PUBLICATIONS

Written Opinion of the International Searching Authority dated Dec. 10, 2015, Int'l Appl. No. PCT/US15/049960; Int'l Filing Date Sep. 14, 2015; 7 pgs.

International Search Report dated Jan. 22, 2016, Int'l Appl. No. PCT/US15/058799, Int'l Filing Date Nov. 3, 2015; 3 pgs.

Written Opinion of the International Searching Authority dated Jan. 22, 2016, Int'l Appl. No. PCT/US15/058799, Int'l Filing Dated Nov. 3, 2015; 5 pgs.

U.S. Appl. No. 14/852,519, filed Sep. 12, 2015, Smith, Robert et al.

International Preliminary Report on Patentability, dated Mar. 14, 2017, Int'l Appl. No. PCT/US15/049960, Int'l Filing Date Sep. 14, 2015; 9 pgs.

International Preliminary Report on Patentability, dated May 9, 2017, Int'l Appl. No. PCT/US15/058799, Int'l Filing Date Nov. 3, 2015; 7 pgs.

* cited by examiner

IDENTIFYING A POTENTIAL DDOS ATTACK USING STATISTICAL ANALYSIS

CROSS-REFERENCES TO RELATED APPLICATIONS

This application claims the benefit of priority to U.S. Provisional Patent Application No. 62/074,407, filed Nov. 3, 2014, titled "IDENTIFYING A POTENTIAL DDOS ATTACK USING STATISTICAL ANALYSIS," the entire contents of which are fully incorporated by reference herein for all purposes. This application is also related to U.S. Patent Publication No. 2013/0291107, filed Apr. 27, 2012, entitled "System and Method for Mitigating Application Layer Distributed Denial of Service Attacks Using Human Behavior Analysis," and U.S. Provisional Patent Application 62/050,053, filed Sep. 12, 2014, entitled "Blocking Forgiveness For DDOS,"), the entire contents of which are fully incorporated by reference herein for all purposes.

FIELD

The disclosure generally relates to computer security in communications networks. Specifically, the disclosure relates to enhanced methods and systems for automation in mitigation of distributed denial of service attacks.

BACKGROUND

In a network like the Internet, resources (e.g., pages of a website) may be requested by legitimate and malicious systems and persons alike. A distributed denial of service (DDOS) attack is an attempt to make resources of a network unavailable to legitimate users. A DDOS attack often involves multiple computers acting together to prevent a targeted website or service from functioning properly by having a group of multiple computers repeatedly request network resources of the website or service. This group of multiple computers is often referred to as a bot or botnet. A result of these repeated requests can be that a website or service has difficulty responding to legitimate requests due to an exhaustion of resources of a website's ability to serve content and, thus, the website or service is effectively unavailable to legitimate users.

Determining if a DDOS attack is underway can be an involved process. One approach involves analyzing network traffic using signature or heuristic-based detection to determine if the perceived behavior coming from various addresses is malicious. Network traffic samples from various sources are analyzed to determine if there is a DDOS attack against a destination IP. This process typically involves many sources of data and a high degree of human intervention and analysis.

Embodiments of the invention address these and other problems, individually and collectively.

BRIEF SUMMARY

Embodiments can identify requests that may be tied to a DDOS attack. For example, the primary identifiers (e.g., a source address) of requests for a network resource (e.g., an entire website or a particular element of the website) can be tracked. In one embodiment, a statistical analysis of how often a particular source address (or other primary identifier) normally makes a request can be used to identify source addresses that make substantially more requests. A normal amount can correspond to an average number of request that a source address makes.

Once requests of potentially offending source addresses are identified, embodiments can perform further analysis on these requests to determine whether they are indeed part of an attack. The further analysis can include human behavior analysis (HBA), e.g., as described in U.S. Patent Publication No. 2013/0291107, entitled "System and Method for Mitigating Application Layer Distributed Denial of Service Attacks Using Human Behavior Analysis," which is herein incorporated by reference.

Thus, according to some embodiments, a system can use statistical analysis methods on various request data in web server logs to identify potential attacks and send data concerned potential attacks to an HBA system for further analysis.

Other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

When identifying a potential DDOS attack, one could have a team of expert analysts analyze network logs to determine the request targets of botnets for Layer 7 attacks. Manually analyzing network logs increases the time it takes to mitigate attacks. Embodiments described herein can have a computer analyze network logs to identify potential attacks according to specific algorithms and, thus, identify potential attacks more efficiently. Information about requests of potential attacks can be input into further analysis modules (e.g., a human behavior analysis (HBA) module) to determine if the identified requests are part of an attack (e.g., if the requests are from a human or a bot). Accordingly, embodiments can automate the process and reduce the amount of time required to resolve DDOS attacks.

I. DDOS Mitigation Using HBA

Figure 1:
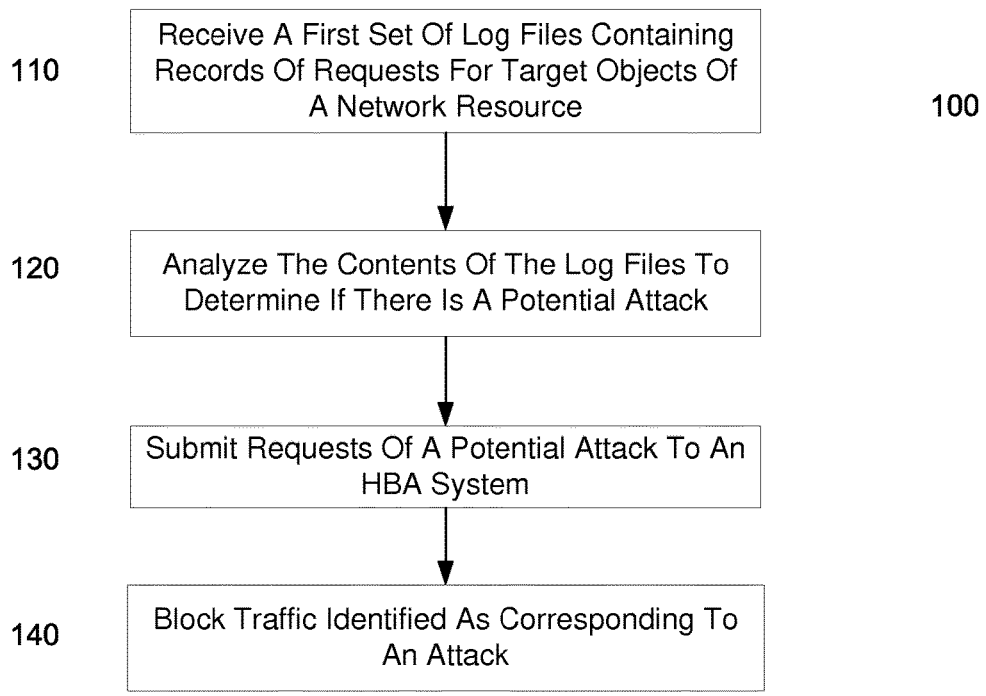
FIG. 1 is a flowchart of a method for identifying information about a potential attack on a network resource.

FIG. 1 is a flowchart of a method 100 for identifying information about a potential attack on a network resource according to embodiments of the present invention.

At block 110, web server access log files are received. These web server log files can contain a history of object requests. Information about the request, including, but not limited to the IP address, request date and time, object requested, HTTP code, bytes served, user agent, and referrer can typically be found in the log files. The log files are generally only accessible by an administrator. As described below, a computer system can receive the log files and analyze records in the log files.

At block 120, the log files are read to ascertain the requests that are being made for network resources, which are then analyzed to determine if there are any potential attacks. Typically, administrators would look at the output of scripts and analyze the top requests to determine if they are potentially related to an attack. These top requests would be added by the administrators into an HBA data request list and they would use the data request list and compare against all known requests in the log in order to determine those that are a part of a botnet attack and those that are not.

At block 130, any potential attack data is sent to an HBA system for further analysis. HBA would analyze the log files for all those requests to determine if there is an attack. Some embodiments of HBA techniques are described in related U.S. Patent Publication No. 2013/0291107. Generally, HBA can correspond to a method of mitigating an application DDOS attack on a network that includes receiving at an application DDOS mitigation appliance application layer logs, parsing the application layer logs into an application layer forensic file, and comparing an entry of the application layer forensic file with a human behavior profile to determine a malicious qualifier associated with an application DDOS attack on the network.

In HBA, there are automated actions. The data that is identified as an outlier is assumed to be malicious. HBA systems are fed a list of information to search for within web server log files. An administrator might run a script that will produce a list of identifiers requesting the most files or repeated requests for a particular file.

That list can be fed into HBA, which will perform further analysis on the log files to determine if an attack is truly underway.

At block 140, if any attacks are found, then the traffic corresponding to those attacks is blocked.

II. Histograms and Outliers

Statistical analysis methods can be applied to various data associated with requests.

The system may build a profile of the average requests for a target from a source address or primary identifier using various techniques, e.g., including a histogram representing a number of requests for an object or target. A standard deviation for each histogram is calculated, and using the standard deviation, outliers can be determined that deviate from the expected number of requests. Such an analysis is effective since bots that perpetrate Layer 7 attacks typically make a larger number of requests than what a normal (e.g., non-malicious) user would make. In another example embodiment, a standard deviation is calculated based on an entropy calculation of Layer 7 requests coming into the system. For example, the system may implement an entropy detector for performing entropy calculations on various Layer 7 requests for various objects (and/or associated with various targets) over a given time.

Figure 2:
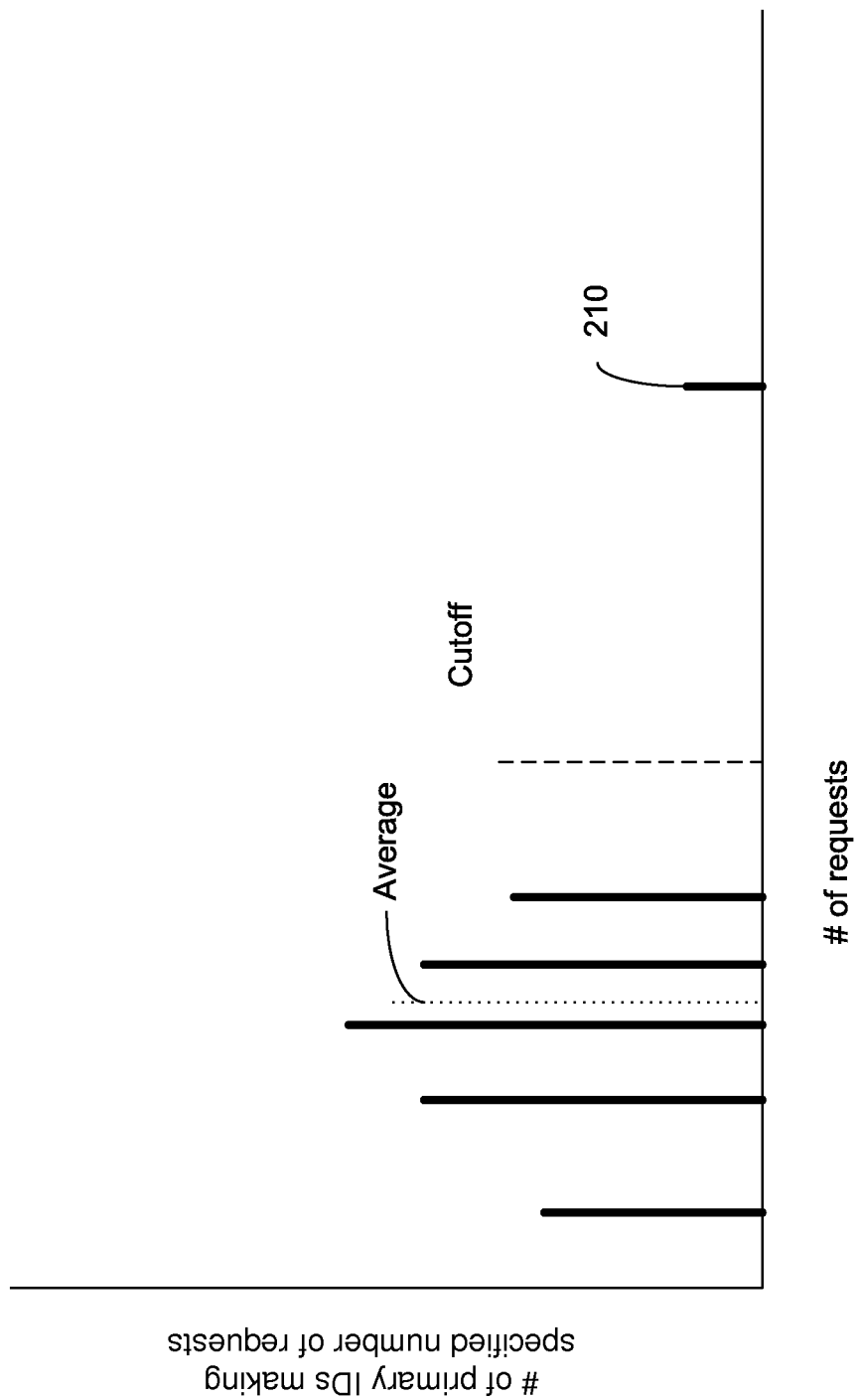
FIG. 2 shows an example histogram plotting number of requests by the number of primary IDs making a specified number of requests.

FIG. 2 shows an example histogram plotting a number of requests by the number of primary IDs making a specified number of requests. In FIG. 2, an Average expected number of requests is calculated based on request data. The Cutoff is based on a standard deviation from the expected number of requests. For example, the Cutoff can be the standard deviation itself or the standard deviation adjusted by a multiplier. In this example, Data point 210 is an outlier because the number of requests it represents is outside the expected request level.

According to embodiments herein, the example system can identify outliers in the request data and perform further analysis. For instance, the system can take a look at those particular request targets and when it identifies them, and then run a test to check the addresses that are making these requests. The test may use an HBA algorithm to determine if requests are associated with bots. If the requests are confirmed to be associated with bots, then an attack can be confirmed. It should be noted that additional statistical analysis of a server log may be used to examine traffic patterns by time, referrer, user agent, or other relevant data.

The use of statistical analysis allows computers to more effectively determine and identify attacks versus normal behavior. In comparison, the analysis performed by human administrators is limited in several ways, e.g., by only being able to look at the output of a tool that analyzes a log file, or calculating the top requests and then determining whether an attack is in fact underway.

Example embodiments of the statistical analysis (and associated metrics) use standard deviations. The initial passthrough for the system can go through each line of each log and each request. For example, the system can look at each source address and build a list of source addresses. For each source address, a small sub-list can be created for each source address containing every single request that that source address made.

For example, if a request is being made for a style sheet, a javascript file, an HTML file, or an image file, then for each of those requested files, every source IP that requested each file is put into a bucket (or group). Then for each request across all the source IP addresses, the system compiles the number of times that that request was made. If, for example, assume a request was made for a style sheet three times from a first remote address, four times from a second remote address, and then two times from a third remote address, the system will create a histogram for that resource (e.g., the style sheet) and calculate a standard deviation. Any request data that falls outside of the expected range, say a source remote address asking 300 times for the style sheet, would be considered an outlier as the volume of requests from that source address is several standard deviations outside of the expected number of requests for the style sheet.

Such data could be used in various ways in addition to being fed into a HBA system. For example, statistical data can indicate: source addresses that are anomalous (and the requests that are coming from those addresses), associated user agents, and other related statistical data. Such statistical data could be distributed, for example, as a plug-in to another system.

For example, the data could be exported to a cPanel server for use in the web server management tool. As such, users could plug the data in a cPanel server and receive notifications when anomalies are detected. These notifications would not necessarily need to be automatically acted on like with an HBA system, but rather could serve as merely as an alert. Such data could be used to naively identify bad targets and then provide an alert to a network administrator.

III. Method

Figure 3:
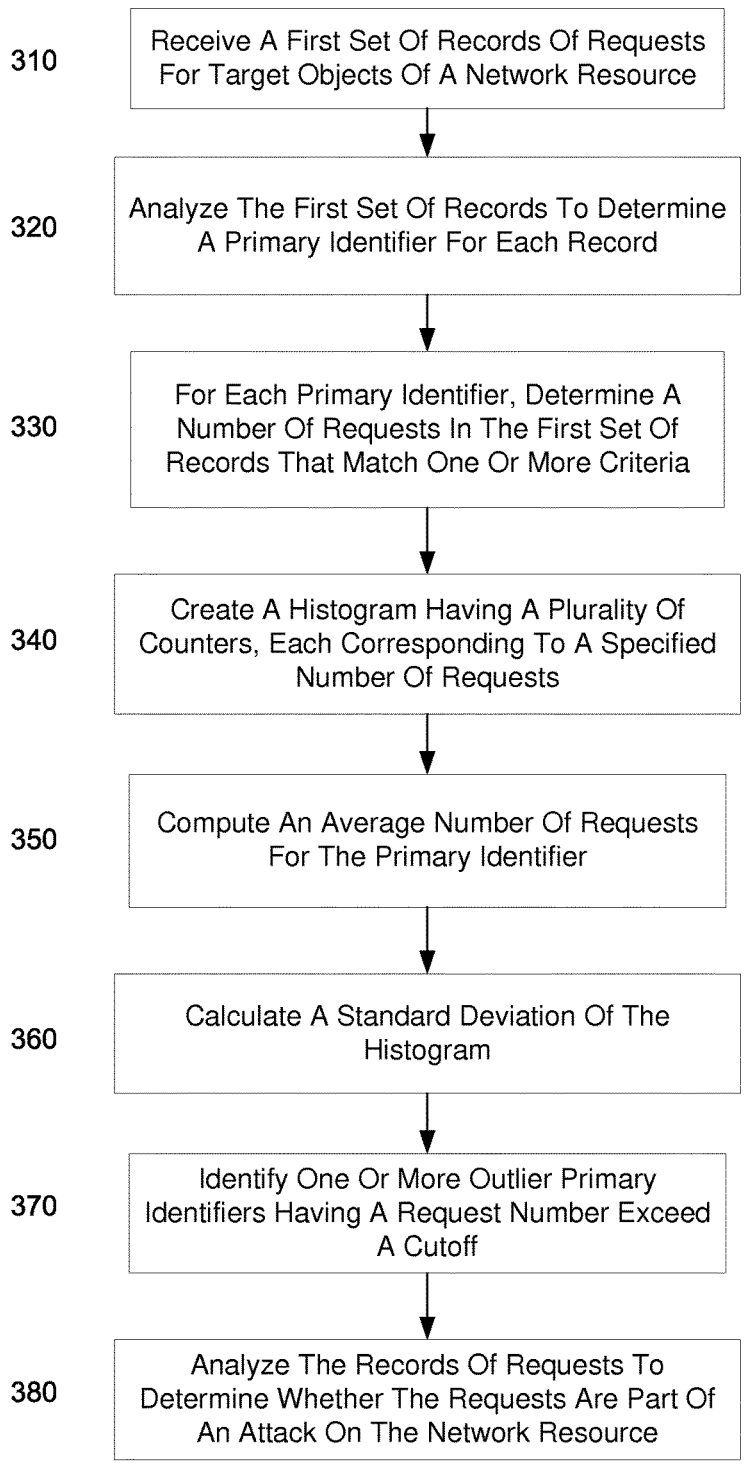
FIG. 3 is a flowchart of a method for using statistical methods in identifying information about a potential attack on a network resource.
Figure 4:
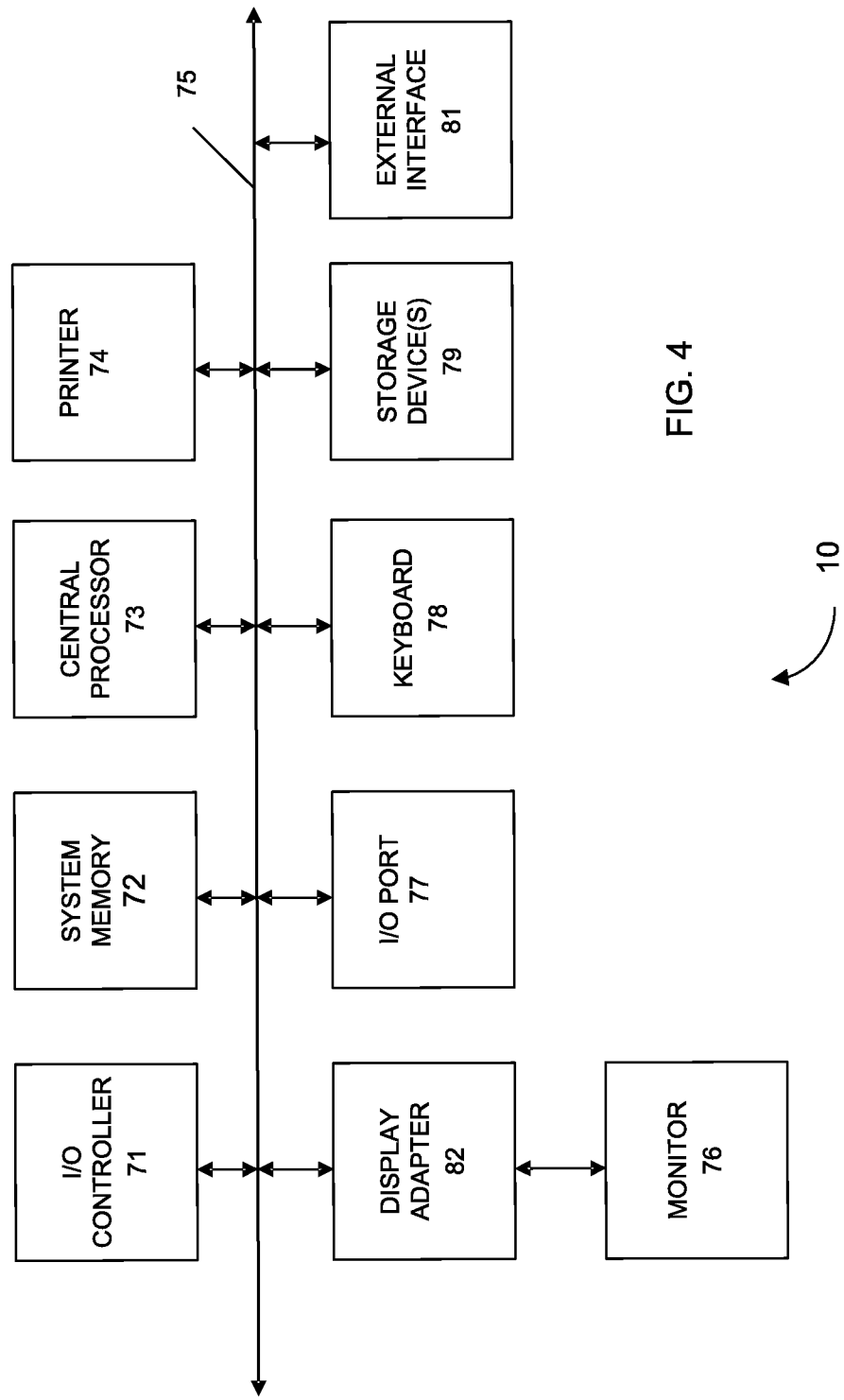
FIG. 4 shows a block diagram of an example computer system usable with system and methods according to embodiments of the present invention.

FIG. 3 is a flowchart of a method 300 for using statistical methods identify information about a potential attack on a network resource. Method 300 may be performed by a computer system, for example the computer as shown in FIG. 4.

On the first instance of an attack, the system is able to capture events (e.g., without the involvement of a human/administrator), tell an HBA system to initiate analysis of the data and record a digest, and then convert that digest into a botnet blueprint. Once a botnet blueprint is established, it can be utilized at a border router. As such, the process does not necessarily have to be repeated for other attacks associated with this particular botnet.

At block 310, a computer system receives a first set of records of requests for target objects of the network resource. These records can be read by the system from web server access log files. A larger number of request events provides more data points for the statistical analysis.

In an example embodiment, the system can run scripts against a log file to get an output of the top requests for a given time (e.g., previous minute). The scripts can access data according to time or count and provide a statistical breakdown of the top requests.

In another example embodiment, the system can use a moving window for creating the histograms. For example, the calculations might be based on the most recent hundred thousand requests. For instance, analysis can be performed on the current set of requests, and then after a time period (e.g., thirty seconds later), the analysis can be performed on the most recent one hundred thousand requests. In another embodiment, the moving window can correspond to all requests received within a specified time period.

In another example embodiment, the system can use a rolling window (i.e., the size of the window is variable). For example, a rolling window could take into account the last several thousand requests or be based on time. Due to variances in traffic, adjustments to the windows may be made to account for such variances.

Typically, each observation cycle generates new data. For example, old data may be cycled out because the system only takes the last set number of requests to look at. Or alternatively, the last minute(s) of requests. As the system receives new data, the old data is pushed out.

In an example embodiment, the system can identify objects/items/etc. that are being requested often enough to indicate a possible attack, and can have a multiple-stage filter for determining whether a bot is perpetrating the attack.

At block 320, the first set of records is analyzed to determine a primary identifier for each record, where the first set of records has a plurality of different primary identifiers. The primary identifier can be the source of the request, the user agent from which the request came, or other identifying information.

For example, assume one remote address requests four image files while another remote address requests eighteen image files, and further assume a standard deviation of five for the current calculation. In this example, the request for eighteen image is clearly an outlier and, therefore, the associated remote address is a suspected address. Furthermore, the system can then ascertain whether that suspected address is also making requests for other objects.

At block 330, for each primary identifier of the plurality of different primary identifiers a request number of requests will be determined in the first set of records that match one or more criteria, the one or more criteria including the request having the primary identifier. This will provide a statistical count of activity by primary identifier.

For example, the system can create a histogram of the activity (e.g., the x-axis representing the number of times a particular source address has requested that particular file).

At block 340, a histogram having a plurality of counters will be created, with each histogram corresponding to a specified number of requests and storing a number of different primary identifiers having the specified number of requests.

At block 350, an average number of requests for primary identifier is created from the counters of the histogram. The average could be calculated from the total number of requests for and the total count of requesting primary identifiers for an object.

At block 360, a standard deviation of the histogram is calculated using the plurality of counts of requesting primary identifiers and the average number of requests. The standard deviation may be the amount of variation from the average number of requests.

For example, assume 50 different source addresses have requested a file three times, then, effectively, the peak of histogram is will be approximately three and the standard deviation may be approximately four or five. Continuing with this example, if a source addresses has requested 18 times, then the 18 requests will be outside standard deviation (i.e., four or five) for that data and histogram, and therefore deemed an outlier. The first stage, for example, comprises the identification and flagging of a data point as an outlier. The second stage, for example, comprises an analysis of whether the suspected source address (associated with the 18 requests in this example) has requested other objects.

At block 370, one or more outlier primary identifiers is identified having the request number exceed a cutoff, the cutoff being based on the standard deviation of the histogram. The cutoff might be the standard deviation or the standard deviation augmented by a multiplier to allow for additional or lesser deviation.

At block 380, the records of requests matching the one or more outlier primary identifiers are analyzed to determine whether the requests are part of an attack on the network resource. This is where the data from the prior steps is sent to HBA to be further analyzed.

For example, the system contains rules for identifying an attack. An attack does not necessarily need to be defined, but the system can identify traffic that should be sent to an HBA configuration. Typically, a bot identifies one object that is on a website and continually requests that object. According to example embodiments herein, such traffic data could be automatically sent to HBA for further analysis.

The top requests can be entered into the HBA data request list and the the HBA could use the data request list to compare against all known requests in the log in order to determine who is a bot, and who is not. As an example, imagine one request is for a particular image. The log files or properties can be entered so that HBA could analyze all of these requests for that particular image and then the HBA analyzes log files for those requests. The HBA can identify, from those requests, which requesting address or addresses are actually a bot and which are not. The HBA can therefore determine whether or not an attack is underway.

For example, on a first pass, the system could compile data associated with a source address into the number of times that particular source address has requested particular objects. For each of a given number of targets being tracked (e.g., top ten), the system could obtain data for all source addresses and then build an associated histogram for each (e.g., including the standard deviation).

In an example embodiment, the system could also apply a multiplier to the standard deviation, depending on what kind of accuracy is desired. For example, the system operators could decide that two times the standard deviation is appropriate, because maybe they do not want to see many alerts, except those outliers that greatly exceed the standard deviation. In other situations a lower multiplier or none at all might be appropriate based on circumstances. The multiplier can assist in cases where error rates or false positives are too high. Additionally the system could have a sliding multiplier that could be adjusted.

According to an example embodiment, multipliers under one would be considered scaling down, while multipliers over one would be considered scaling up. For example, the system could be scaled up or down depending on how many false positives are detected and/or the preference of the system operator.

In an example embodiment, when building a histogram, the x-axis represents the number of requests (e.g., number of requests for a source, number of requests for a user agent, etc.). For example, each histogram is constructed by identifier for the requesters whether or not the requester is a source or a user agent. Additionally, the system can count the number of requests to a particular target or all targets.

For the user agents, once the system has identified that the particular user agent is malicious, then it can assume that other user agents that have a matching profile are going to be malicious, and, thus, no further checking would be needed. In other words, once an outlier user agent is identified, no further checking is needed, and the additional steps of looking for other top items/objects/etc. is not needed.

For example, the system can run a test to check the addresses that are making these requests (i.e., the statistical analysis), and then provide the data to HBA, which could find an outlier for this particular target. The system can analyze certain patterns with a focus on that particular target or targets that were identified as outliers. Once those targets are identified as outliers, then the system analyzes those patterns to determine whether it is associated with a human or a bot.

In an example embodiment, after the attack is identified, the system can create a configuration file including, for example, a bad targets list, and the system could automatically create a separate good targets list. It should be noted that an address in the good target list can subsequently end up in the bad targets list. As such, the good targets list should be dynamically updated.

In an example embodiment, the system may flag targets, but such flagging does not necessarily indicate that the targets are bad. As described earlier, the additional step of HBA analysis determines whether target is truly bad. For example, the system can bring items to the forefront of HBA, telling HBA what to look out for. The system can perform further analysis to determine if these are bots associated with a diagnosed attack.

For example, if multiple outliers have been identified, HBA can determine if more bad targets exist. As such, such analysis allows for induction where if the system did get an outlier, ultimately HBA might determine no, it is not actually associated with a bot so it is not actually a bad target. HBA could determine that, while it may be an outlier, that it also has some probably good aspects, too. Thus, it is not really a bot and do not need to be flagged. HBA could also maintain black and white lists.

In an example embodiment, a role of the system can be to determine what is possibly an attack target and then what the good targets are and create an associated good targets list. Then, HBA compares the good targets list against the log to determine which are truly bad, while also providing the bad addresses associated with this target. Therefore, the system can preemptively discard requests from those particular bad addresses.

In an example embodiment, the system can decrease the amount of data sent to an HBA system, which alleviates the need to perform a more processing-heavy analysis. For example, HBA can be told more directly what is needed to be analyzed. As opposed to analyzing every possible request, the HBA can look at a particular subset of requests and associated data in order to figure out human versus bot.

In some instances, the system analyzes every single incoming request because it has to look to see if any of those requests do, in fact, match what the suspected malicious requests are. HBA uses pattern analysis with some given target or a pattern. The HBA can look at these requests to see if there is an attack involved. HBA can use pattern analysis to then determine the bots that are causing the attack. HBA might also use other requests to determine who is a bot or not. If there are some requesters that happen to have requested that item a few times, HBA might determine that the requester also requested a several other items/objects/etc. and non-malicious (e.g., human user).

For example, once an address has been identified as a bad address, it is not necessary to go through the process again for other resources being attacked by this particular botnet since the system has identified it as a bad address. For example, traffic from that bad address can just be discarded at the border router. As such, this particular traffic will no longer be analyzed because it is dropped at the border router.

IV. Primary Identifiers

In an example embodiment, the system can read web server access log files, which can contain several fields, any of which might be used at any time for the purpose of identifying an attacker. Some of the fields can include, for example, the request address, request method, user agents, and referral agents. There are many things in web server logs, which can be useful in determining legitimate from malicious users. Various fields can be used as the primary identifier. For example, embodiments can determine a number of request for each of a plurality of user agents.

Example embodiments can apply the histogram and the calculation of a cutoff (e.g., using a standard deviation) to additional log data, like the user agent. Since the system can actually measure those in the same way that request target is measured, the procedure for determining abnormalities or outliers is equivalent. For example, measuring how many requests have been made using a particular user agent. As an example, in a normal operating scenario for most user agents, the number of requests are a hundred. Where the number of requests by a certain user agent is ten thousand, then that is an outlier.

For example, a bot might be associated with a malicious user agent title or label and may be making a couple hundred requests just from a single user agent, where the expected values are much lower. In that scenario, there is an outlier. Similarly, a user agent might be requesting an entire group of targets, i.e., it does not have to be from just one target). Thus, the histogram created would be for user agent per source.

V. Additional Criteria for Identifying Potential Attack

In some embodiments, the system reads web server access log files, which can contain several fields, any of which might be used at any time for the purpose of identifying an attacker. Some of the fields may include, for example, the request address, request method, user agents, and referral agents. There are many things in web server logs that are useful in determining legitimate versus malicious users.

In an example embodiment, the system can track whether a particular source requested a particular request target. Additional data in the logs useful to track may include, for example, data in the request method or in the user agent, the identifier that tells a server the type of browser that the end user is making the request from, etc. For example, if the system is monitoring a request target and anomalous requests for a particular object are detected, the user agent could have additional data that is also out of line with expected data. For example, the user agent can contain data on a requestor's browser, operating system, rendering engine, and other requestor data.

In an example embodiment, a record of requests (e.g., top ten) will be available in a log file. If there is a Layer 7 attack, there would be entries written to the log that would reflect what the bots are asking for.

In an example embodiment, certain thresholds of data can also be established. To make the system more efficient, the a certain threshold of requested objects (e.g., top ten) might be the only objects that have their statistical data collected and histograms created. As such, it may not be feasible or worthwhile to collect and analyze data for objects that are not commonly requested. For example, the system may implement a requirement such that there has to be a threshold number of requests for an object before further analysis is conducted.

According to an example embodiment, the amount of targets requested and the amount that fall outside of a standard deviation can vary. In some cases, an outlier happens for the most requested target. If no outliers exist for, say, the most requested target, the system proceeds to the second most requested target and determines whether an outlier exists for that target. The system might mark a source address as a bot. In other cases, the source address might have to request a threshold number of objects, and if the source address is an outlier for any of threshold number of objects it is classified as a bot. As such, the limits and required numbers of outliers are customizable as rules that can be implemented by the system (as well as scaling past a minimum value).

In an example embodiment, certain additional thresholds can be established for required number of requests and/or targets. In some cases, what might appear as an attack is determined to be acceptable, based on other observed data. For example, the system can require that the number of requests from a source address needs to be an outlier for multiple objects, and not make normal amounts of requests for other files. For example, if a source address makes requests for one or two objects, where the number of requests is an outlier, but also requests ten additional objects just a few times, this could be determined to be acceptable. Bots typically do not make acceptable requests for ten objects and only one or two requests that are unacceptable. For example, a threshold requirement of a specified number (e.g., 5) of outlier requests could be established, or the threshold could scale based on a percentage of total top requests.

In an example embodiment, the system can be configured to analyze the most requested items (e.g., top ten). In this vein, based on the size and activity of a website, the system could implement a logarithmic step up adjustment in terms of the number of unique requests that could be analyzed, or it could be based on a percentage.

In an example embodiment, other data points could be tracked for a user agent. For example, the system could track by source with a rolling window the top user agents that are observed. However, a bot might bring along with it its own unique user agent, which could become an outlier of that list. As long as the system is keeping a rolling window of the top user agents using the statistical analysis, then the outlier would quickly become apparent and that may give the ability to be able to block with respect to the user agent. Bots typically push more traffic through and, thus, can be discovered by their increased level of requests.

VI. Computer System

Any of the computer systems mentioned herein may utilize any suitable number of subsystems. Examples of such subsystems are shown in FIG. 4 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 4 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of identifying information about a potential attack on a network resource, the method comprising:
one or more processors performing the steps of:
receiving a first set of records of requests for target objects of the network resource;
analyzing the first set of records to determine a primary identifier for each record, the first set of records having a plurality of different primary identifiers, wherein the primary identifier of a record is a user agent of the request;
for each primary identifier of the plurality of different primary identifiers:
determining a request number of requests in the first set of records that match one or more criteria, the one or more criteria including the request having the primary identifier;
creating a histogram having a plurality of counters, each counter corresponding to a specified number of requests and storing a count of different primary identifiers having a corresponding request number be the specified number of requests;
computing an average number of requests for primary identifiers from the counters of the histogram;
calculating a standard deviation of the histogram using the plurality of counters and the average number of requests;
identifying one or more outlier primary identifiers having the request number exceed a cutoff, the cutoff being based on the standard deviation of the histogram; and
analyzing the records of requests matching the one or more outlier primary identifiers to determine whether the requests are part of an attack on the network resource.

2. The method of claim 1, further comprising applying a multiplier to the standard deviation.

3. The method of claim 1, wherein the first set of records are received in a single log file.

4. The method of claim 1, further comprising:
providing an alert to a user, the alert identifying the one or more outlier primary identifiers; and
receiving, from the user, a request to analyze records of requests matching one or more outlier primary identifiers.

5. The method of claim 1, further comprising:
receiving a second set of records of requests for target objects of the network resource.

6. The method of claim 5, further comprising:
periodically receiving a new set of records, where the new set of records correspond to a specified time window.

7. The method of claim 1, wherein the one or more criteria also include the request being for a particular target object of the network resource.

8. The method of claim 7, further comprising:
adding the particular target object to a bad target list when requests corresponding to the outlier primary identifier are part of an attack on the network resource.

9. The method of claim 7, further comprising:
creating a plurality of other histograms, each corresponding to a different target object of the network resource, wherein the plurality of other histograms are analyzed to determine whether the requests of the one or more outlier primary identifiers are part of an attack on the network resource.

10. The method of claim 9, further comprising:
for each primary identifier:
for each of the target objects of the network resource:
determining a number of requests that are for the target object and that match the primary identifier.

11. The method of claim 9, wherein analyzing the records of requests matching the one or more outlier primary identifiers includes:
for each of the one or more outlier primary identifiers:
determining whether the outlier primary identifier is also an outlier of any of the other histograms;
identifying a first group of outlier primary identifier as potentially corresponding to an attack when the outlier primary identifier is an outlier in more than a specified number of the other histograms and/or has requests for less than the first threshold number of different target objects.

12. The method of claim 11, further comprising:
providing the first group of outlier primary identifiers and corresponding target objects to a human behavior routine that analyzes the records to determine whether a pattern of requests corresponding to the first group of outlier primary identifiers is characteristic of an attack by a bot.

13. The method of claim 11, further comprising:
for each of the one or more outlier primary identifiers:
identifying the outlier primary identifier as not corresponding to an attack when the outlier primary identifier has requests for at least the first threshold number of different target objects and is an outlier in less than or same as the specified number of the other histograms.

14. The method of claim 11, wherein the number of other histograms is equal to or greater than a predetermined number.

15. The method of claim 11, wherein the number of other histograms is equal to or greater than a specified percentage of the total number of target objects requested from the network resource.

16. The method of claim 11, wherein a histogram is determined for each target object having at least a specified number of requests.

17. The method of claim 1, wherein the primary identifier of a record is a source address of the request of the record.

18. The method of claim 1, wherein the network resource is a website.

19. The method of claim 1, further comprising:
adding an outlier primary identifier to a bad list when requests corresponding to the outlier primary identifier are part of an attack on the network resource.

* * * * *